US012602825B2

(12) United States Patent
Peng et al.

(10) Patent No.: US 12,602,825 B2
(45) Date of Patent: Apr. 14, 2026

(54) HUMAN BODY POSITIONING METHOD BASED ON MULTI-PERSPECTIVES AND LIGHTING SYSTEM

(71) Applicant: Guangzhou Haoyang Electronic Co., Ltd., Guangzhou (CN)

(72) Inventors: Yingru Peng, Guangzhou (CN); Weikai Jiang, Guangzhou (CN); Qiancheng Huang, Guangzhou (CN); Zhiguang Liang, Guangzhou (CN); Jianping Liu, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 288 days.

(21) Appl. No.: 18/459,244

(22) Filed: Aug. 31, 2023

(65) Prior Publication Data

US 2024/0428449 A1      Dec. 26, 2024

(30) Foreign Application Priority Data

Jun. 26, 2023    (CN) .......................... 202310753106.8

(51) Int. Cl.
*G06T 7/73* (2017.01)

(52) U.S. Cl.
CPC ...... *G06T 7/74* (2017.01); *G06T 2207/10028* (2013.01)

(58) Field of Classification Search
None
See application file for complete search history.

(56) References Cited

U.S. PATENT DOCUMENTS 9,677,755 B1 *  6/2017  Linnell ................. H05B 47/155
12,267,589 B1 *  4/2025  Slotznick ................. H04R 1/08
(Continued)

FOREIGN PATENT DOCUMENTS

CN      107240124 A      10/2017
CN      112258600 A      1/2021
(Continued)

OTHER PUBLICATIONS

Khan, S. M., & Shah, M. (May 2006). A multiview approach to tracking people in crowded scenes using a planar homography constraint. In European Conference on Computer Vision (pp. 133-146). Berlin, Heidelberg: Springer Berlin Heidelberg. (Year: 2006).*
(Continued)

*Primary Examiner* — Ian L Lemieux
(74) *Attorney, Agent, or Firm* — Muncy, Geissler, Olds & Lowe, P.C.

(57)      ABSTRACT

A human body positioning method based on multi-perspectives includes simultaneously capturing pictures from at least two perspectives angles and extracting human body feature points, matching the human body feature points of a same human body of a same position in different pictures to form matched point groups and calculating 3D coordinates of corresponding 3D point of each matched point group in a 3D space, further calculating and weighting spatial geometric error between the 3D point and each human body feature point of the corresponding matched point group in each original picture to obtain reprojection error of the 3D point, and subsequent to projecting each 3D point onto the ground to obtain single-point 2D coordinates thereof on the ground, weighting the projected single-point 2D coordinates according to the reprojection error of the corresponding 3D point to obtain a projection distribution of the corresponding human body on the ground.

11 Claims, 6 Drawing Sheets

(56) References Cited

U.S. PATENT DOCUMENTS

| | | | | | |
|---|---|---|---|---|---|
| 2010/0026624 | A1* | 2/2010 | Bell | | G06F 3/0425 |
| | | | | | 345/156 |
| 2015/0308642 | A1* | 10/2015 | Vo | | H04N 23/56 |
| | | | | | 362/648 |
| 2016/0300383 | A1 | 10/2016 | Liu et al. | | |
| 2017/0205061 | A1* | 7/2017 | Broers | | H04N 7/183 |
| 2020/0364443 | A1 | 11/2020 | Chen et al. | | |
| 2021/0392462 | A1* | 12/2021 | Feeney | | F21V 14/04 |
| 2022/0357019 | A1* | 11/2022 | Alfier | | H05B 47/115 |
| 2024/0340520 | A1* | 10/2024 | Rebiffe | | H04N 25/707 |

FOREIGN PATENT DOCUMENTS

| | | | |
|---|---|---|---|
| CN | 112546607 | A | 3/2021 |
| CN | 113160325 | A | 7/2021 |
| CN | 114529605 | A | 5/2022 |
| EP | 3886046 | A1 | 9/2021 |

OTHER PUBLICATIONS

Mittal, A., & Davis, L. S. (2003). M2tracker: A multi-view approach to segmenting and tracking people in a cluttered scene. International Journal of Computer Vision, 51(3), 189-203. (Year: 2003).*

Lv, C., Yin, J., & Gao, Y. (Jun. 2019). Stage actor tracking method based on kalman filter. In 2019 Eleventh International Conference on Advanced Computational Intelligence (ICACI) (pp. 46-49). IEEE. (Year: 2019).*

Chun, S., Lee, C. S., & Jang, J. S. (2015). Real-time smart lighting control using human motion tracking from depth camera. Journal of Real-Time Image Processing, 10(4), 805-820. (Year: 2015).*

Schwarz, D. A. (2023). Pre-visualising progress: a new paradigm for the intuitive design and control of theatrical and stage lighting (Doctoral dissertation, Manchester Metropolitan University). (Year: 2023).*

Zhang, Q., & Chan, A. B. (2019). Wide-area crowd counting via ground-plane density maps and multi-view fusion cnns. In Proceedings of the IEEE/CVF Conference on Computer Vision and Pattern Recognition (pp. 8297-8306). (Year: 2019).*

International Search Report and Written Opinion for PCT Application No. PCT/CN2023/116184 dated Feb. 1, 2025 (Year: 2025).*

Qiu, H., Wang, C., Wang, J., Wang, N., & Zeng, W. (2019). Cross view fusion for 3d human pose estimation. In Proceedings of the IEEE/CVF international conference on computer vision (pp. 4342-4351). (Year: 2019).*

Anonymous, Console. Wikipedia [online] [retrieved Aug. 12, 2025] <URL:https://en.wikipedia.org/wiki/Console> (Year: 2025) (Year: 2025).*

Li, K., Jiao, N., Liu, Y., Wang, Y., & Yang, J. (Oct. 2018). Shape and Pose Estimation for Closely Interacting Persons Using Multi-view Images. In Computer Graphics Forum (vol. 37, No. 7, pp. 361-371). (Year: 2018).*

Ghidoni, S., & Munaro, M. (2017). A multi-viewpoint feature-based re-identification system driven by skeleton keypoints. Robotics and Autonomous Systems, 90, 45-54. (Year: 2017).*

* cited by examiner

HUMAN BODY POSITIONING METHOD BASED ON MULTI-PERSPECTIVES AND LIGHTING SYSTEM

CROSS REFERENCE TO RELATED APPLICATIONS

The present application claims priorities from Chinese Application No. CN 202310753106.8 filed on Jun. 26, 2023, all of which are hereby incorporated herein by reference.

TECHNICAL FIELD

The present invention relates to the technical field of site light fixtures, and more particularly, relates to a human body positioning method based on multi-perspectives and a lighting system.

BACKGROUND

In the current lighting system for entertainment, light beams are usually required to follow and illuminate objects in a site, such as human bodies. It is generally achieved in a way of manually controlling the projection direction of light beams by the lighting technician to let the light spots track and illuminate specific objects. However, the accuracy of manual tracking is greatly affected by the anthropic factors both from the lighting technician and the objects, as light fixtures are generally far from the site to be illuminated. Another commonly used way is that actors in the site wear special active tags (such as UWB-TAG or other tags that can actively send out signals) or passive tags (such as infrared markers or other tags that can be detected, but do not actively send out signals), so that the actors can be tracked by only tracking such active tag or passive tag. However, on the one hand, there are specific occasions where the actors are inconvenient to wear the tags. On the other hand, data transmission of the active tags may be interfered by the human body or the surrounding scene, which will result in inaccurate positioning or tracking jitter. Likewise, the passive tag may also be obscured, thus causing failure of tracking.

SUMMARY

With regard to the above-mentioned deficiencies, the present invention provides a human body positioning method based on multi-perspectives, which can obtain more reliable position information of a human body, meanwhile some interference caused by mis-match can be eliminated, achieving more accurate light beam projection of light fixtures.

According to the present invention, a human body positioning method includes steps of:

S1) simultaneously capturing pictures of a site from at least two angles by a plurality of camera devices;

S2) extracting human body feature points of each human body in each picture;

S3) matching the human body feature points of a same human body of a same position in different pictures to form matched point groups, and according to the position, pose and internal parameters of each camera device, calculating 3D coordinates of corresponding 3D point of each matched point group in a 3D space; and S4) calculating the spatial geometric error between each 3D point and each human body feature point of the corresponding matched point group in each original picture, and weighting the spatial geometric error to obtain the reprojection error of the 3D point, and subsequent to projecting each 3D point onto the ground to obtain single-point 2D coordinates thereof on the ground, weighting the projected single-point 2D coordinates according to the reprojection error of the corresponding 3D point to obtain the projection distribution of the human body on the ground.

In the inventive human body positioning method based on multi-perspectives, as the projection distribution of the human body on the ground is obtained by weighting the projected single-point 2D coordinates, some possible mismatching interference can be eliminated that may occur in the process of forming the matched point group by matching the human body feature points. In addition, the projection distribution of the human body on the ground is a collection of the weighted single-point 2D coordinates, which thus can determine the maximum possible projection range of the human body on the ground, achieving more accurate positioning. Most importantly, the human body is directly identified free from active tags or passive tags worn on the human body, such method thus is suitable for wide range of scenarios with higher applicability.

Particularly, in the step S2, the human body feature point refers to image feature points. The image feature points mean points where the gray value of an image changes drastically or points where the curvature is larger on the edge of an image (i.e., an intersection of two edges). Therefore, the image feature point can reflect the essential characteristics of the image, and a target object in the image can be identified.

Further particularly, as ORB feature point has the advantages of high extraction speed, and taking scale invariance and rotation invariance into account, the image feature point in the present invention is preferably an ORB feature point. The inventive method thus can further improve the effect of the algorithm and take both the real-time performance and the algorithmic performance into consideration.

Additionally or alternatively, in the step S2, the human body feature points refer to human body key points. The human body key points are for positioning and identification of some key parts of the human body, such as the nose, the left eye, the right eye, the left ear, the right ear, the left shoulder, the right shoulder, the left elbow, the right elbow, the left wrist, the right wrist, the left crotch, the right crotch, the left knee, the right knee, the left ankle, and the right ankle. In the present invention, one human body key point represents one part of the human body.

According to the present invention, in the step S2, the human body key points and the image feature points of the human body in the picture may be simultaneously extracted, and both the human body key points and the image feature points are processed by step S3 and S4 to collectively obtain the projection distribution of the human body on the ground. There are situations that some human body key points may be undetectable due to the posture of the human body and a shooting angle, and some image feature points may also be undetectable as they are not as stable as the human body key points and are large in number and randomly distributed, therefore, the human body key points and the image feature points are simultaneously used for integrated positioning of the human body, leading the positioning more accurate.

Particularly, in the step S2, the human body in the picture is first detected by a human body detection algorithm and limited by a body frame, then the human body feature point is extracted in the body frame. In this way, the human body feature points are extracted only in the body frame, instead of the whole picture, which thus can reduce the number of the human body feature points. In addition, the body frame can separate the plurality of human bodies, facilitating distinguishing different human bodies.

According to the present invention, in a case that there is a plurality of human bodies on the site, the body frames of the same human body in different pictures are preferably first searched out, that is one body frame is found in each picture to correspond to each human body, which can facilitate subsequent positioning of different human bodies. For this, in the step S3, when a plurality of human bodies are on the site, the degree of match among region blocks defined by the body frames in different pictures is calculated and body frames with the best degree of match in different pictures are selected to refer to the same human body.

Particularly, the image similarity among the region blocks is used to assess the degree of match among the body frames. Because such way can promptly determine the image similarity, thus increasing the whole positioning speed.

More particularly, one body frame is taken out from each picture, forced matching is performed on the human body feature point within the body frame to form the matched point groups, and the 3D coordinates of the corresponding 3D point of each matched point group in a 3D space and the spatial geometric error between the 3D point and the human body feature point in each original picture are calculated. Then the spatial geometric error is weighted to obtain the reprojection error of the 3D point, and the reprojection errors of the 3D points corresponding to all the human body feature points in the body frame are weighted. The obtained negative value of the weighted reprojection error is used as the degree of match among the body frames.

According to the present invention, in the step S1, with the center of the site as the center of a circle, adjacent camera devices particularly form a central angle greater than 45° and less than 90°. With such configuration, neither will the camera devices be spaced too close together, resulting in a waste of material resources and an increase in computation, nor will the camera devices be spaced too far apart, resulting in a too large angle difference during acquiring images of the human body, which causes that it is unable to determine whether the image belongs to the same human body.

In order to realize share of computing power among multiple site scenes and thus lower the requirement for the local computing power, in the step S1 of the present invention, the pictures captured by the camera device are uploaded to a server and steps S2 and S3 are both carried out in the server.

The present invention further provides a lighting system, including a site, a plurality of light fixtures and at least two camera devices. The camera devices are configured for positioning a human body using the method described above, and the light fixtures project lights beam according to the positional information thereof and the projection distribution of the human body on the ground.

DETAILED DESCRIPTION

Figure 1:
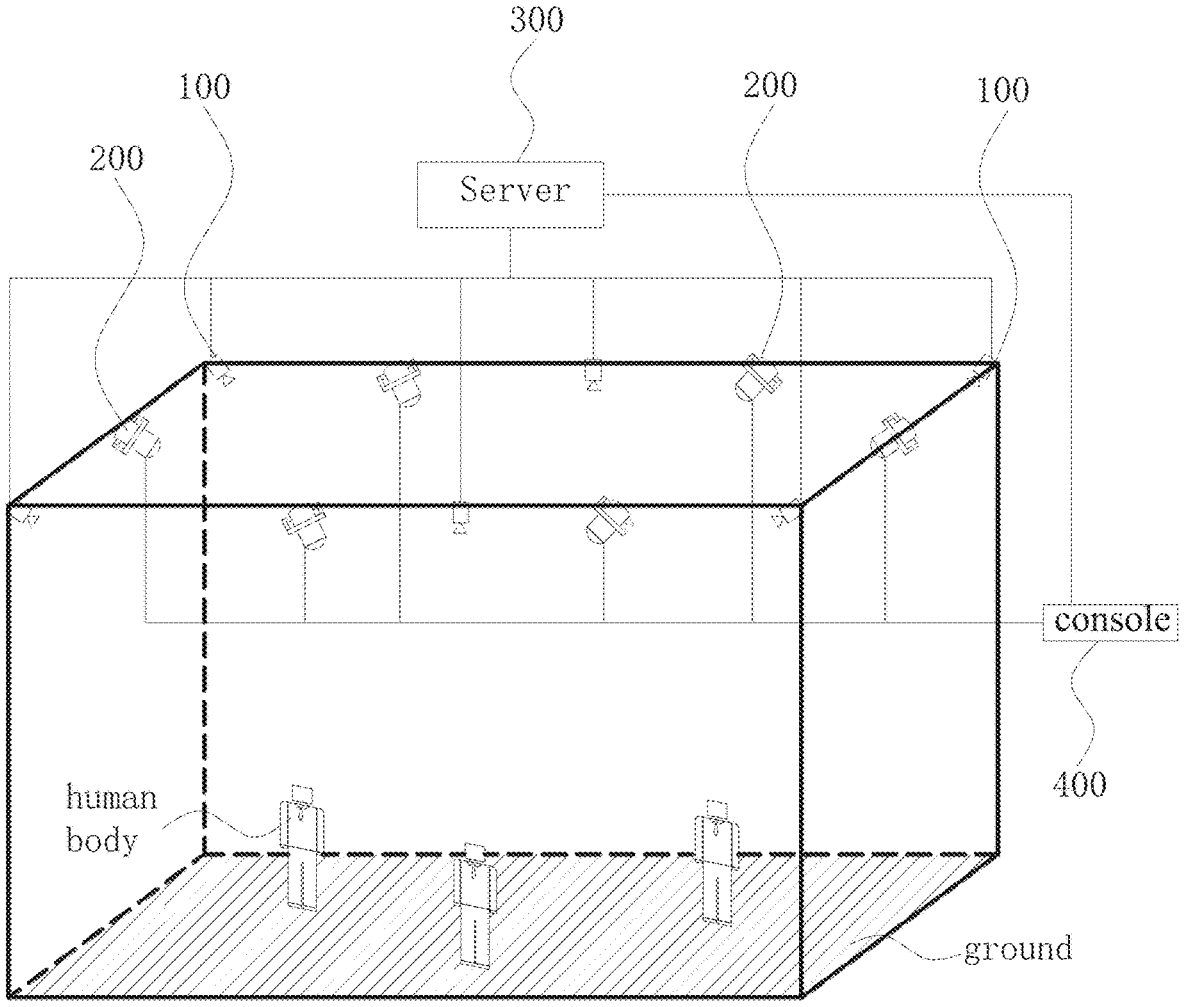
FIG. 1 is a schematic structural view of a lighting system according to an embodiment of the present invention.

The accompanying drawings are for exemplary illustration only and should not be construed as limitations on this invention. In order to better illustrate this embodiment, some parts in the accompanying drawings may be omitted, enlarged or reduced, and they do not represent the size of the actual product. For those skilled in the art, it is understandable that certain well-known structures and descriptions thereof in the drawings may be omitted. The positional relationship described in the drawings is only for exemplary illustration, and should not be construed as limitations on this invention.

Figure 2:
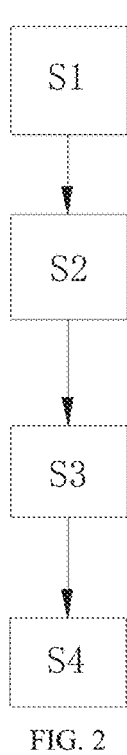
FIG. 2 is a flowchart of a human body positioning method based on multi-perspectives according to an embodiment of the present invention.

In combination with FIG. 1 and FIG. 2, a human body positioning method based on multi-perspectives includes following steps according to an embodiment of the present invention.

In step S1, pictures of a site to be illuminated are captured by at least one camera device 100 simultaneously from at least two angles.

In step S2, human body feature points of each human body in each picture are extracted.

In step S3, the human body feature points of a same human body of a same position in different pictures are matched to form matched point groups, and according to the position, pose and internal parameters of each camera device 100, 3D coordinates of corresponding 3D point of each matched point group in a 3D space are calculated.

Finally, in step S4, the spatial geometric error between each 3D point and each human body feature point of the corresponding matched point group in each original picture is calculated and weighted to obtain the reprojection error of the 3D point, then each 3D point is projected onto the ground to obtain single-point 2D coordinates thereof on the ground, and the projected single-point 2D coordinates are weighted to obtain a projection distribution of the human body on the ground according to the reprojection error of the corresponding 3D point.

According to the human body positioning method based on multi-perspectives, as the projection distribution of the human body on the ground is obtained by weighting the projected single-point 2D coordinates, some possible mismatching interference can be eliminated that may occur in the process of forming the matched point group by matching the human body feature points. In addition, the projection distribution of the human body on the ground is a collection of the weighted single-point 2D coordinates, which thus can determine the maximum possible projection range of the human body on the ground, achieving more accurate positioning. Most importantly, the human body is directly identified free from active tags or passive tags worn on the human body, such method thus is suitable for wide range of scenarios with higher applicability.

It should be noted that the method of matching the human body feature points of a same human body of a same position in different pictures to form matched point groups is carried out by a feature point matching algorithm, such as a Brute-Force matching method, cross matching, KNN matching, and random sample consensus matching (RANSAC), which is well known in the art and, therefore, will not be described in detail herein.

The 3D space refers to a realistic 3D space in real word, generally with the center of the site as a zero point, the ground of the site as an X and Y plane, and the ground perpendicular to the site upwardly as the Z-axis direction, jointly determined by the mounting position of each camera device 100, the shooting posture (external reference), and the internal parameters thereof, which belongs to the principle of triangulation of the camera well known in the art and, therefore, will not be described in detail herein. In this way, each matched point group in the picture captured by the camera device 100 can be mapped to the 3D space by an epipolar geometry constraint algorithm, and corresponding 3D points are formed and coordinates thereof in reality are known. The epipolar geometry constraint algorithm can automatically calculate the coordinates of the corresponding 3D points of one matched point group in the 3D space, which is well known in the art and, therefore, will not be described in detail herein.

The method of calculating the spatial geometric error between the 3D point and each human body feature point of the matched point group in each original picture is conducted in a way that according to the characteristics of an optical system of the camera device 100 and the geometric relationship between the 3D point and each human body feature point in the corresponding matched point group, the mapping deviation of the 3D point with respect to each human body feature point of the matched point group in the original picture is calculated, or the offset of points obtained by projecting, on the basis of the characteristics of the optical system of the camera device 100, the human body feature point into the 3D space with respect to the 3D point is calculated, or the offset of the 3D points projected onto the picture according to the characteristics of the optical system of the camera device 100 with respect to the human body feature points is calculated. The method of weighting the spatial geometric error between each human body feature point of the same matched point group and the 3D point to obtain the reprojection error of the 3D point is conducted in a way of averaging the spatial geometric error, directly accumulating the spatial geometric error, or matching weights according to the magnitude of the spatial geometric error and then accumulating the spatial geometric error. The method of weighting, according to the reprojection error of the corresponding 3D point, the projected single-point 2D coordinates to collectively obtain the projection distribution of the human body on the ground is conducted in a way of weighting, according to the reprojection error of the 3D point, each single-point 2D coordinate corresponding to all the 3D points of the same human body to obtain the projection distribution of the human body on the ground. The projection distribution here refers to a collection of the single-point 2D coordinates with weights.

It can exclude some 3D points with the reprojection error greater than a certain threshold by projecting each 3D point onto the ground to obtain the single-point 2D coordinates thereof on the ground. That is 3D points corresponding to the matched point group with poor matching will be not projected in such way.

Figure 4:
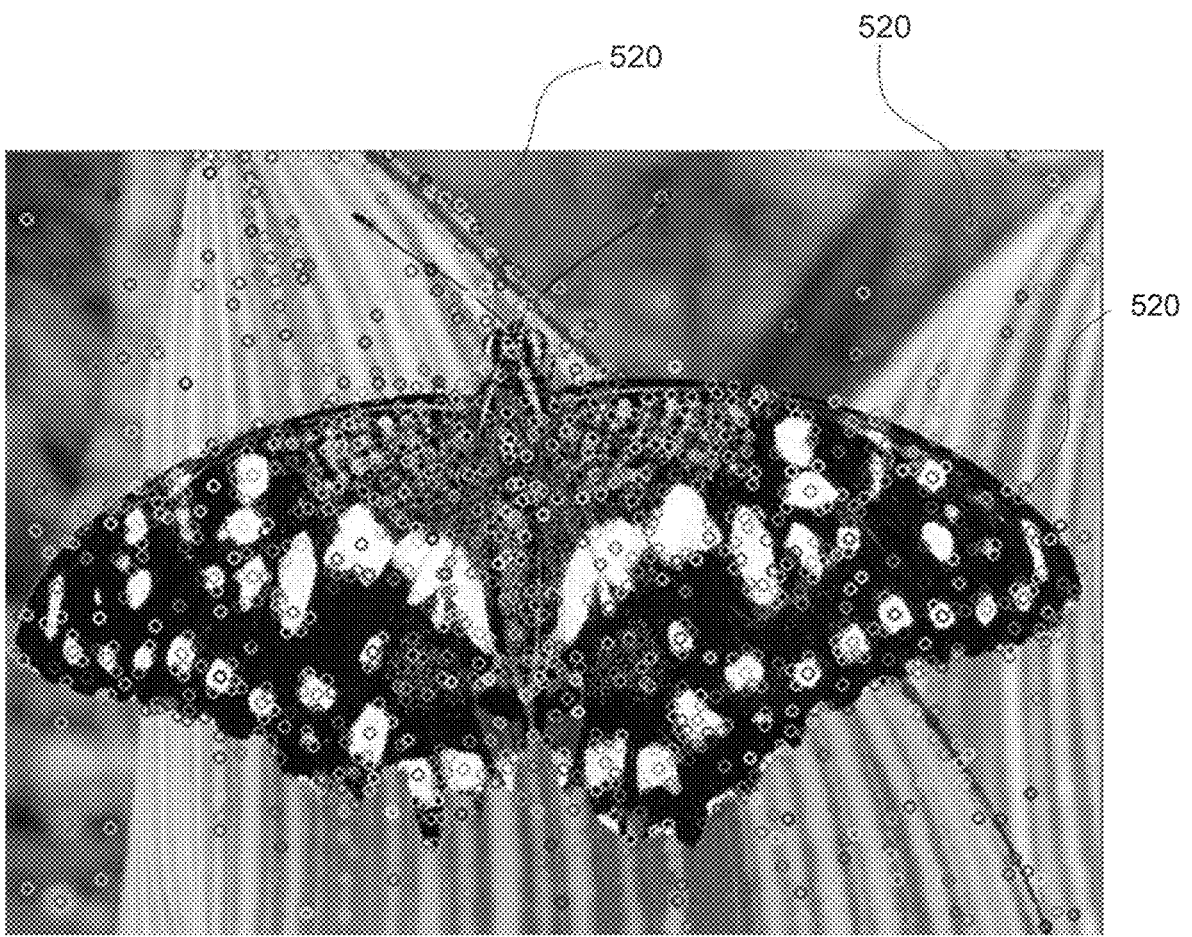
FIG. 4 is a schematic view of image feature points according to an embodiment of the present invention.
Figure 6:
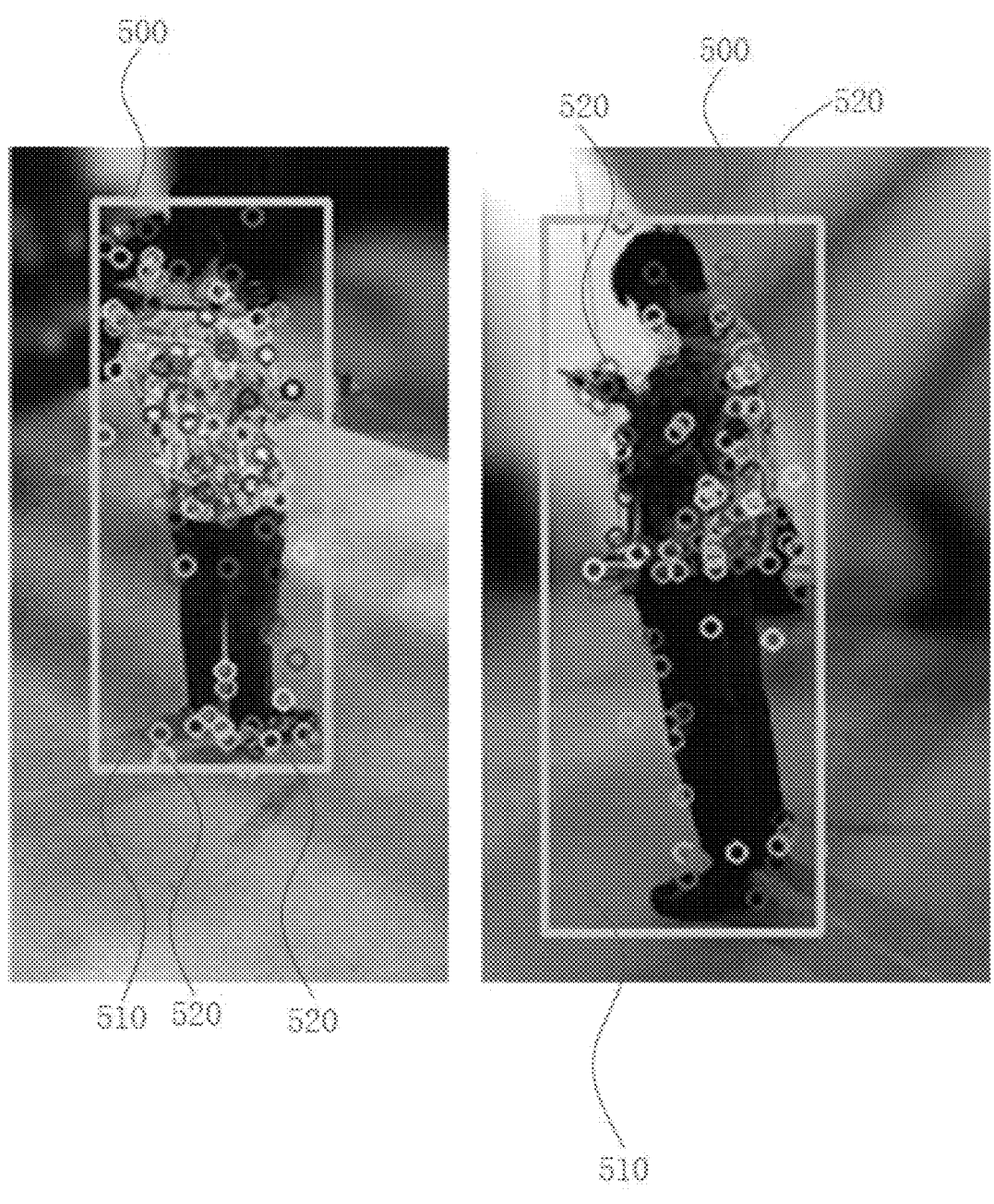
FIG. 6 is a schematic view of image feature points extracted from pictures acquired from two angles according to an embodiment of the present invention.

In a preferred embodiment of the present invention, in the step S2, the human body feature point refers to an image feature point 520. The image feature point 520 means a point where the gray value of an image changes drastically or a point where the curvature is larger on the edge of an image (i.e., an intersection of two edges). Therefore, the image feature point 520 can reflect the essential characteristics of the image, and a target object in the image can be identified thereby. However, the image feature point 520 is indefinite, like patterns and folds on clothes, and even the shadow of the human body or an object can be the image feature point 520. For example, FIG. 4 shows some image feature points 520 commonly extracted. FIG. 6 shows two pictures of the human body taken from two different angles according to the method, which depicts the image feature points 520 extracted in the picture.

In a further preferred embodiment of the present invention, the image feature point 520 may be an ORB feature point. Such feature point can achieve high extraction speed and the scale invariance and rotation invariance are taken into account, which further improves the effect of the algorithm and takes both the real-time performance and the algorithmic performance into consideration. In this case, even though the picture of the human body is zoomed or rotated, the same image feature point 520 can still be identified.

Figure 5:
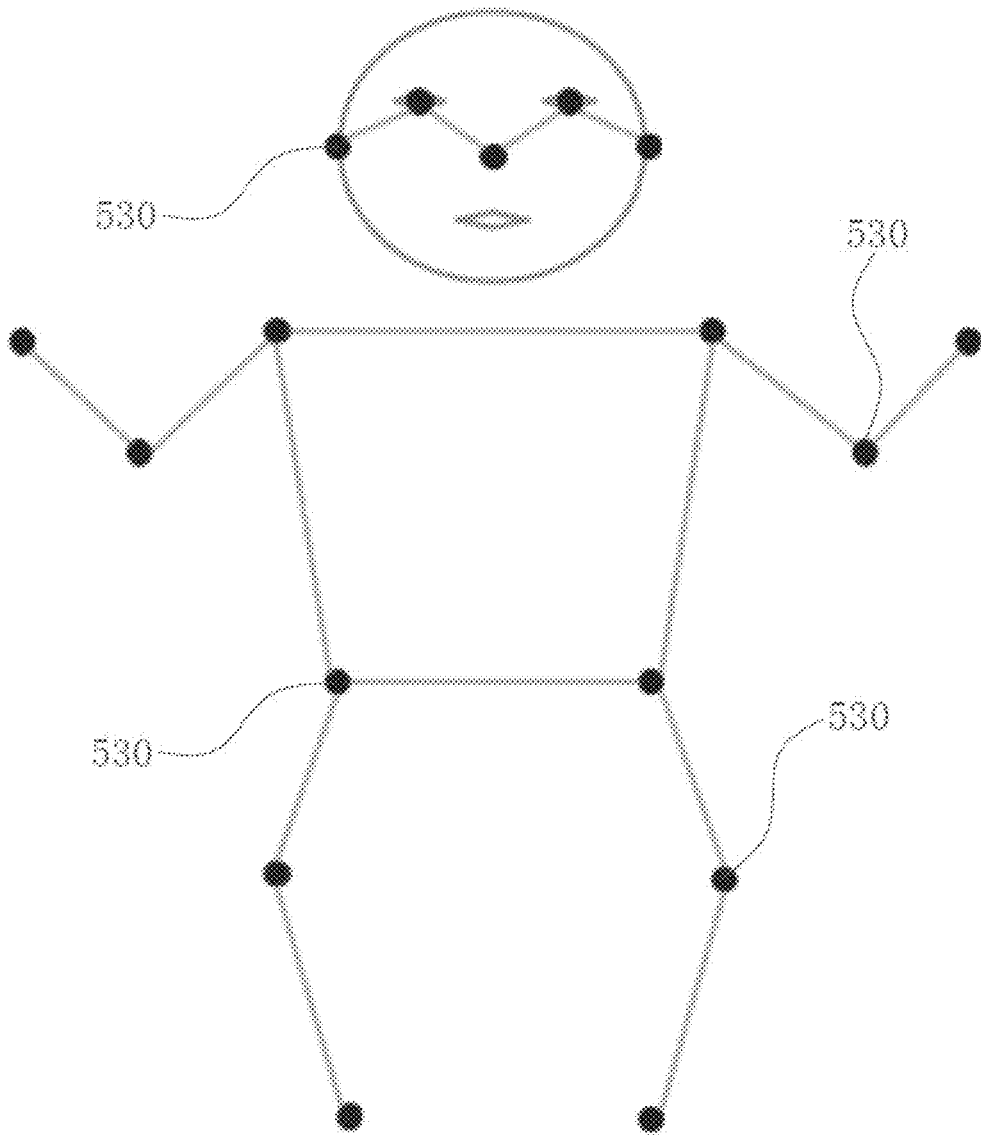
FIG. 5 is a schematic view of human body feature points according to an embodiment of the present invention.
Figure 7:
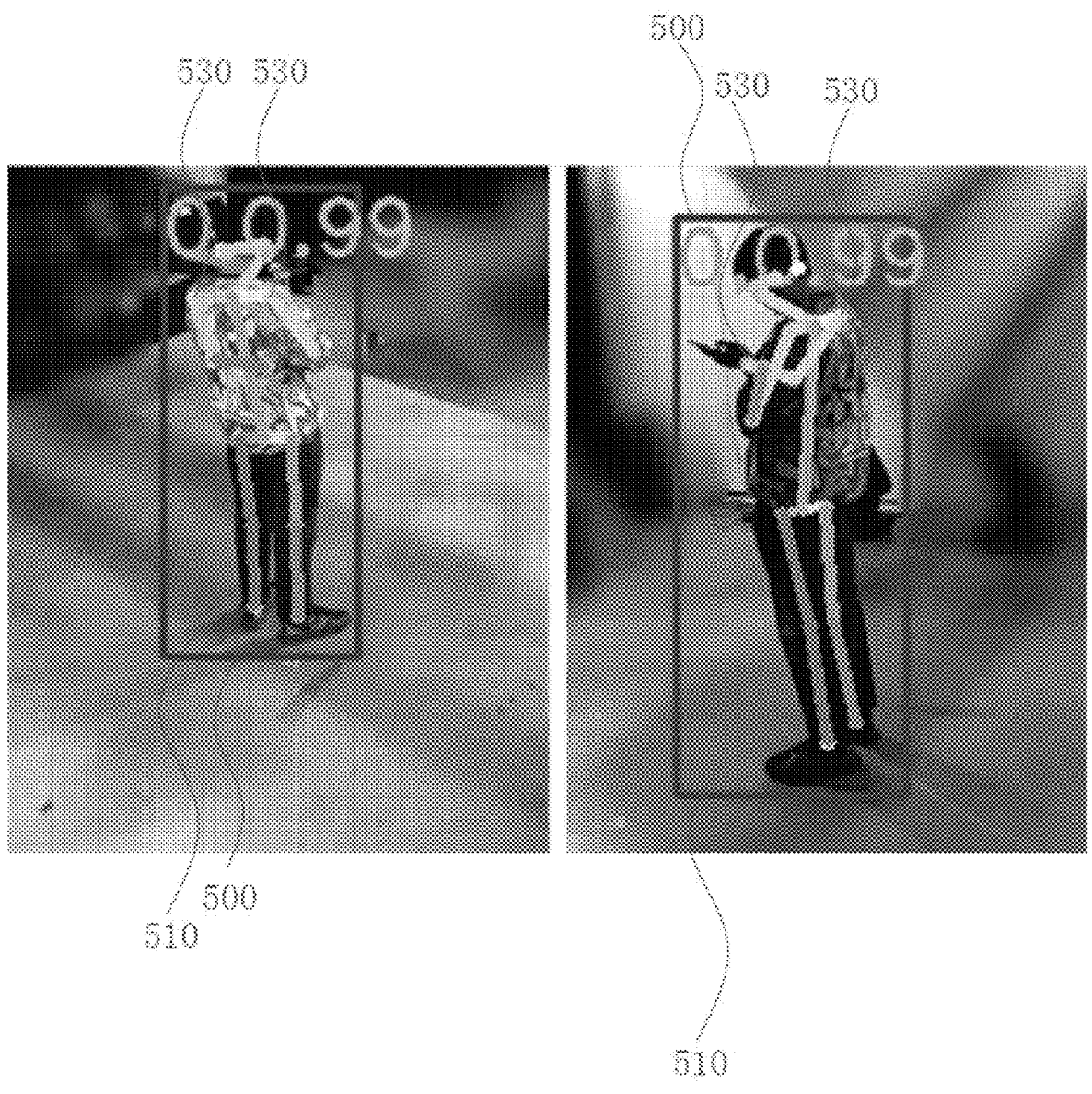
FIG. 7 is a schematic view of human body key points extracted from the pictures acquired from two angles according to an embodiment of the present invention.

In another preferred embodiment of the present invention, in the step S2, the human body feature point is a human body key point 530. For example, FIG. 5 shows human body key points 530 commonly extracted is such way. The human body key points 530 are for positioning and identification of some key parts of the human body, including the nose, the left eye, the right eye, the left ear, the right ear, the left shoulder, the right shoulder, the left elbow, the right elbow, the left wrist, the right wrist, the left crotch, the right crotch, the left knee, the right knee, the left ankle, and the right ankle. In the present embodiment, one human body key point 530 represents one part of the human body. FIG. 7 shows two pictures of a human body taken from two different angles according to the method, which depicts the extracted human body key point 530 in the picture.

It should be noted that not all of the described human body key points 530 need to be detected, which can be selected as necessary, for example, only the human body key points 530 of the torso part (including the left shoulder, the right shoulder, the left crotch and the right crotch) are detected.

Of course, more key points may be detected as demand, without being limited to the seventeen key points described above.

Preferably, the human body key point 530 is detected using a human body posture detection algorithm based on deep neural network. Such algorithm is well known in the art and, therefore, will not be described in detail herein.

In another preferred embodiment of the present invention, in the step S2, the human body key points 530 and the image feature points 520 of the human body in the picture are simultaneously extracted, and both the human body key points 530 and the image feature points 520 are processed by steps S3 and S4 to collectively obtain the projection distribution of the human body on the ground. In the process of the human body key points 530 and the image feature points 520 being processed by the step S3 and S4, the human body key points and the image feature points are dependent of each other to form the corresponding matched point group and the corresponding 3D point respectively. Some human body key points 530 may be undetectable due to the posture of the human body and a shooting angle, and some image feature points 520 may also be undetectable as they are not as stable as the human body key points 530 and are large in number and randomly distributed, therefore, the human body key points 530 and the image feature points 520 are simultaneously used for integrated positioning of the human body, leading the positioning more accurate.

Figure 3:
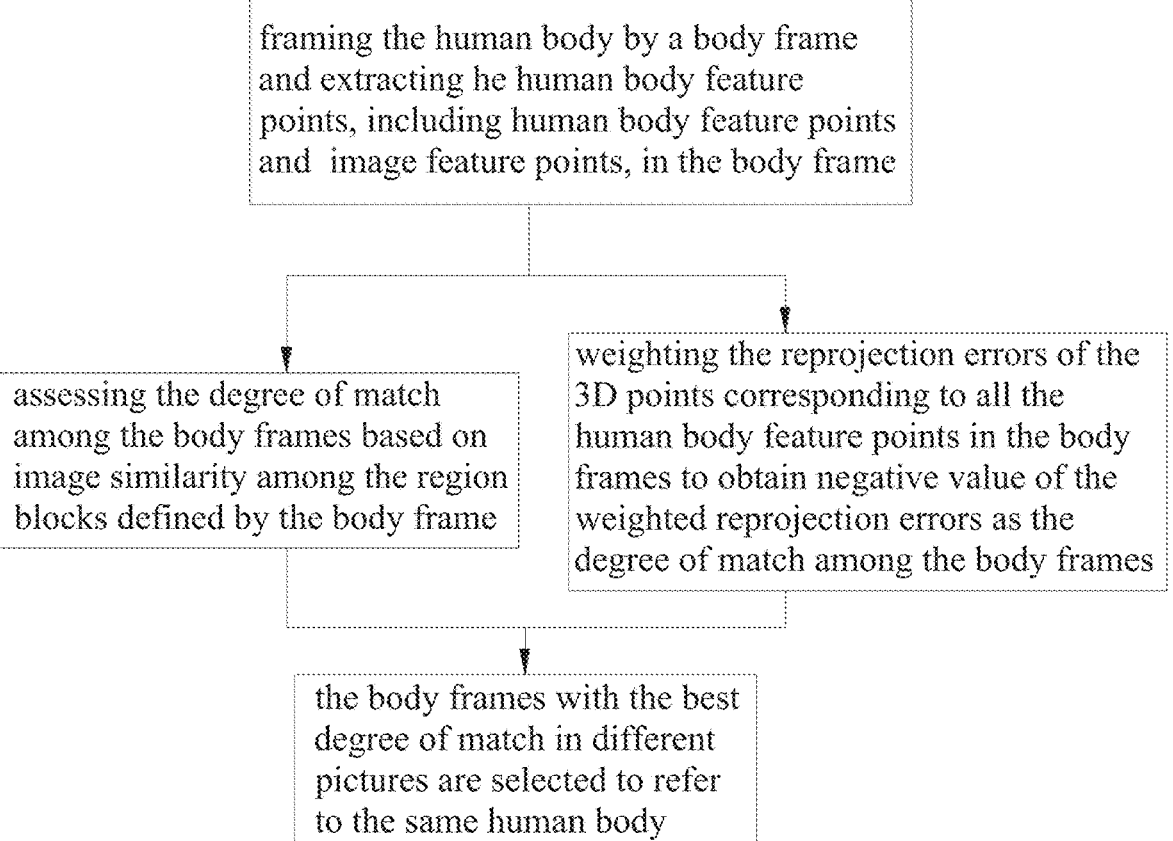
FIG. 3 is a flowchart showing how to match body frames of a same human body in different pictures according to an embodiment of the present invention.

As shown in FIG. 3, FIG. 6 and FIG. 7, in a preferred embodiment of the present invention, in the step S2, prior to extracting the human body feature points, the human body in the picture is first detected by a human body detection algorithm and the human body in the picture is limited by a body frame 500, then the human body feature points are extracted in the body frame 500. In this way, the human body feature points are extracted only in the body frame 500, instead of the whole picture, which can reduce the number of the human body feature points. In addition, the body frame 500 can separate a plurality of human bodies, facilitating distinguishing different human bodies.

Preferably, the human body in the picture is detected by a target detection algorithm based on deep neural network and the human body is limited by the body frame 500 preferably in a rectangular shape. Such algorithm is well known in the art and, therefore, will not be described in detail herein.

In a preferred embodiment of the present invention, in the step S3, a plurality of human bodies are on the site, the degree of match among region blocks 510 defined by the body frames 500 in different pictures is calculated and body frames 500 with the best degree of match in different pictures are selected to refer to the same human body. When there is a plurality of human bodies on the site, the body frames 500 of the same human body in different pictures are first searched out, that is, for each human body, one corresponding body frame 500 is found in each picture, which facilitates subsequent positioning for different human bodies.

Preferably, subsequent to calculating the degree of match among the region blocks 510 defined by the body frames 510 in different pictures, body frames 500 with the best degree of match in different pictures are selected refer to the same human body by using the Hungary algorithm.

During matching, the body frames 500 with the degree of match below a certain threshold may be excluded in such way. That is there may be no body frames 50 corresponding to certain human body in some of the pictures, because the corresponding camera device 100 may not be able to capture the human body due to inappropriate mounting position, i.e., inappropriate shooting angle.

In a preferred embodiment of the present invention, the image similarity among the region blocks 510 is used to assess the degree of match among the body frames 500. It can increase the positioning speed as the image similarity can be determined fast. Calculating of the image similarity among the region blocks 510 is well known in the art and, therefore, will not be described in detail herein.

In a preferred embodiment of the present invention, one body frame 500 is taken out from each picture, forced matching is performed on the human body feature point within the body frame 500 to form the plurality of matched point groups, and the 3D coordinates of the corresponding 3D point of each matched point group in a 3D space and the spatial geometric error between the 3D point and the human body feature point in each original picture are calculated. Then the spatial geometric error is weighted to obtain the reprojection error of the 3D point, the reprojection errors of the 3D points corresponding to all the human body feature points in the body frame 500 are weighted, and the negative value of the weighted reprojection error is used as the degree of match among the body frames 500.

It is generally considered that multiple human body feature points of the same matched point group should correspond to the same position of the human body, if two body frames 500 correspond to the same human body, then the weighted value obtained by weighting the reprojection error of the 3D points corresponding to all the human body feature points within the two body frames 500 will be very small, while if the two body frames 500 don't correspond to the same human body, the two body frames are referred to mismatched, which will lead to increased weighted value obtained by weighting the reprojection error of the 3D points corresponding to all the human body feature points within the two body frames 500. Therefore, the weighted value of the reprojection error of the 3D points corresponding to all the human body feature points within the body frames 500 can be calculated after forced matching, and the negative value of the weighted reprojection error thus can be used as the degree of match among the body frames 500.

In this case, the human body feature point may be the image feature point 520, or the human body key point 530, or in combination with both the image feature point 520 and the human body key point 530. In the situation that the human body feature point includes both the image feature point 520 and the human body key point 530, forced matching is performed on both the image feature point 520 and the human body key point 530 within one body frame 500 to form the plurality of matched point groups, and subsequent calculation is performed to obtain the degree of match among the body frames 500.

As show in FIG. 1, in a preferred embodiment of the present invention, in the step S1, with the center of the site as the center of a circle, adjacent camera devices 100 preferably forms a central angle greater than 45° and less than 90°. In such configuration, neither will the camera devices 100 be spaced too close together, resulting in a waste of material resources and an increase in computation, nor will the camera devices 100 be spaced too far apart, resulting in a too large angle difference during acquiring images of the human body, which causes that it is unable to determine whether the image belongs to the same human body.

More preferably, in this embodiment, with the center of the site as the center of a circle, adjacent camera devices 100 forms a central angle of 60°, i.e., six cameras are arranged around one site.

In a preferred embodiment of the present invention, in the step S1, the pictures captured by the camera device 100 are uploaded to a server 300 in a wired or wireless mode, and steps S2 and S3 are both carried out in the server 300. In this way, it is possible to realize share of computing power among multiple site scenes, thereby lowering the requirement for the local computing power.

If necessary, steps S2, S3, and S4 can all be performed locally without using the cloud server 300.

As shown in FIG. 1, the present invention further provides a lighting system, including a site, a plurality of light fixtures 200 and at least two camera devices 100, wherein the camera devices 100 are used for positioning a human body in accordance with the method described above, and the light fixture 200 projects lights beam according to the positional information thereof and the projection distribution of the human body on the ground. As the projection distribution is a collection of single-point 2D coordinates with weights, the light beam of the light fixtures 200 can be projected more accurately, and accordingly when the light beam is illuminated to the human body, the human body can be surrounded in a smaller light beam diameter.

After the server 300 obtains the projection distribution of the human body on the ground, the server 300 will send the information in a wired or wireless mode to a console 400 connected to the light fixtures 200 to control the light fixtures 200 to project light beams as demanded.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A human body positioning method based on multi-perspectives, comprising steps of:

S1) simultaneously capturing pictures of a site from at least two angles by a plurality of camera devices;

S2) extracting human body feature points of each human body in each picture;

S3) matching the human body feature points of a same human body of a same position in different pictures to form matched point groups, and according to position, pose and internal parameters of each camera device, calculating 3D coordinates of corresponding 3D point of each matched point group in a 3D space;

S4) calculating a spatial geometric error between the 3D point and each human body feature point of the corresponding matched point group in each picture, and weighting the spatial geometric error to obtain a reprojection error of the corresponding 3D point, and subsequent to projecting the corresponding 3D point onto a ground to obtain single-point 2D coordinates thereof on the ground, weighting the projected single-point 2D coordinates according to the reprojection error of the corresponding 3D point in the corresponding matched point group to obtain a projection distribution of the corresponding human body on the ground, wherein the human body feature points include human body key points and image feature points of the human body in each picture, which are simultaneously extracted in the step S2), and both the human body key points and the image feature points are processed by the steps S3) and S4) to collectively obtain the projection distribution of the human body on the ground; and S5) projecting light beams, by light fixtures, according to positional information of the respective light fixtures and the projection distribution of the corresponding human body on the ground obtained in the step S4).

2. The human body positioning method based on multi-perspectives according to claim 1, wherein the image feature points are ORB feature points.

3. The human body positioning method based on multi-perspectives according to claim 1, wherein in the step S2), the human body in each picture is detected by a human body detection algorithm and framed by a body frame, and the human body feature points are extracted in the body frame.

4. The human body positioning method based on multi-perspectives according to claim 3, wherein in the step S3), there are a plurality of human bodies on the site, degree of match among region blocks defined by the body frames in different pictures is calculated and the body frames with the best degree of match in different pictures are selected to refer to the same human body.

5. The human body positioning method based on multi-perspectives according to claim 4, wherein image similarity among the region blocks is used to assess the degree of match among the body frames.

6. The human body positioning method based on multi-perspectives according to claim 4, comprising: subsequent to taking out one body frame from each picture, performing forced matching on the human body feature points in the body frame taken out from each picture to form matched point groups, calculating the 3D coordinates of the corresponding 3D point of each matched point group in a 3D space and the spatial geometric error between the corresponding 3D point and the human body feature points in each picture, weighting the spatial geometric errors of all human body feature points in corresponding matched point group to obtain the reprojection error of the corresponding 3D point of the corresponding matched point group, and weighting the reprojection errors of the 3D points corresponding to all the human body feature points in the body frames taken out to obtain a weighted reprojection error, negative value of the weighted reprojection errors taken as the degree of match among the body frames.

7. The human body positioning method based on multi-perspectives according to claim 1, wherein in the step S1), with the center of the site as the center of a circle, adjacent camera devices are configured to form a central angle greater than 45° and less than 90°.

8. The human body positioning method based on multi-perspectives according to claim 1, wherein in the S1), the pictures captured by the camera devices are uploaded to a server, and the steps S2) and S3) are both carried out in the server.

9. A lighting system adapted to conduct the method according to claim 1, comprising at least two camera devices for capturing pictures of a site to be illuminated a server configured to obtain a projection distribution of corresponding human body on ground of the site, and light fixtures configured to projects lights beams on the site to be illuminated according to positional information thereof and the projection distribution of the corresponding human body on the ground.

10. A human body positioning method based on multi-perspectives, comprising steps of:

S1) simultaneously capturing pictures of a site from at least two angles by a plurality of camera devices;

S2) extracting human body feature points of each human body in each picture;

S3) matching the human body feature points of a same human body of a same position in different pictures to form matched point groups, and according to position, pose and internal parameters of each camera device, calculating 3D coordinates of corresponding 3D point of each matched point group in a 3D space;

S4) calculating a spatial geometric error between the 3D point and each human body feature point of the corresponding matched point group in each picture, and weighting the spatial geometric error to obtain a reprojection error of the corresponding 3D point, and subsequent to projecting the corresponding 3D point onto a ground to obtain single-point 2D coordinates thereof on the ground, weighting the projected single-point 2D coordinates according to the reprojection error of the corresponding 3D point in the corresponding matched point group to obtain a projection distribution of the corresponding human body on the ground; and S5) projecting light beams, by light fixtures, according to positional information of the respective light fixtures and the projection distribution of the corresponding human body on the ground obtained in the step S4), wherein in the step S2), the human body in each picture is detected by a human body detection algorithm and framed by a body frame, and the human body feature points are extracted in the body frame, wherein in the step S3), there are a plurality of human bodies on the site, degree of match among region blocks defined by the body frames in different pictures is calculated, and the body frames with the best degree of match in different pictures are selected to refer to the same human body, and wherein image similarity among the region blocks is used to assess the degree of match among the body frames.

11. A human body positioning method based on multi-perspectives, comprising steps of:

S1) simultaneously capturing pictures of a site from at least two angles by a plurality of camera devices;

S2) extracting human body feature points of each human body in each picture;

S3) matching the human body feature points of a same human body of a same position in different pictures to form matched point groups, and according to position, pose and internal parameters of each camera device, calculating 3D coordinates of corresponding 3D point of each matched point group in a 3D space;

S4) calculating a spatial geometric error between the 3D point and each human body feature point of the corresponding matched point group in each picture, and weighting the spatial geometric error to obtain a reprojection error of the corresponding 3D point, and subsequent to projecting the corresponding 3D point onto a ground to obtain single-point 2D coordinates thereof on the ground, weighting the projected single-point 2D coordinates according to the reprojection error of the corresponding 3D point in the corresponding matched point group to obtain a projection distribution of the corresponding human body on the ground; and S5) projecting light beams, by light fixtures, according to positional information of the respective light fixtures and the projection distribution of the corresponding human body on the ground obtained in the step S4), wherein in the step S2), the human body in each picture is detected by a human body detection algorithm and framed by a body frame, and the human body feature points are extracted in the body frame, wherein in the step S3), there are a plurality of human bodies on the site, degree of match among region blocks defined by the body frames in different pictures is calculated, and the body frames with the best degree of match in different pictures are selected to refer to the same human body, and wherein subsequent to taking out one body frame from each picture, forced matching on the human body feature points in the body frame taken out from each picture is performed to form matched point groups, the 3D coordinates of the corresponding 3D point of each matched point group in a 3D space and the spatial geometric errors between the corresponding 3D point and the human body feature points in each picture are calculated, the spatial geometric errors of all human body feature points in corresponding matched point group are weighted to obtain the reprojection error of the corresponding 3D point of the corresponding matched point group, and the reprojection errors of the 3D points corresponding to all the human body feature points in the body frames taken out is weighted to obtain a weighted reprojection error, negative value of the weighted reprojection error taken as the degree of match among the body frames.

* * * * *